(12) United States Patent
Kondaveeti et al.

(10) Patent No.: US 9,727,723 B1
(45) Date of Patent: Aug. 8, 2017

(54) RECOMMENDATION SYSTEM BASED APPROACH IN REDUCING FALSE POSITIVES IN ANOMALY DETECTION

(71) Applicant: EMC Corporation, Hopkinton, MA (US)

(72) Inventors: Anirudh Kondaveeti, Foster City, CA (US); Derek Lin, San Mateo, CA (US); Hulya Emir-Farinas, San Francisco, CA (US)

(73) Assignee: EMC IP Holding Co. LLC, Hopkinton, MA (US)

( * ) Notice: Subject to any disclaimer, the term of this patent is extended or adjusted under 35 U.S.C. 154(b) by 170 days.

(21) Appl. No.: 14/308,590

(22) Filed: Jun. 18, 2014

(51) Int. Cl.
*G06F 21/50* (2013.01)
*H04L 29/06* (2006.01)
*G06F 21/55* (2013.01)

(52) U.S. Cl.
CPC .......... *G06F 21/50* (2013.01); *H04L 63/1425* (2013.01); *G06F 21/552* (2013.01)

(58) Field of Classification Search
CPC .... G06F 21/50; G06F 21/552; G06F 21/6218; H04L 63/1425; H04L 41/14; H04L 41/142; H04L 41/145; H04L 41/147; H04L 67/18; H04L 67/22
See application file for complete search history.

(56) References Cited

U.S. PATENT DOCUMENTS

| | | | | |
|---|---|---|---|---|
| 2008/0250323 A1* | 10/2008 | Huff | ...................... | G06F 9/4446 715/733 |
| 2010/0064366 A1* | 3/2010 | Zhang | ............................. | 726/22 |
| 2011/0184977 A1* | 7/2011 | Du | ........................... | G06Q 10/10 707/769 |
| 2012/0210158 A1* | 8/2012 | Akiyama | .............. | G06F 21/554 714/2 |
| 2012/0246293 A1* | 9/2012 | De Jager | ............... | G06F 21/552 709/224 |
| 2014/0143407 A1* | 5/2014 | Zhang | .................... | H04L 41/145 709/224 |
| 2014/0188895 A1* | 7/2014 | Wang | ................ | G06F 17/30699 707/748 |

(Continued)

OTHER PUBLICATIONS

Wang, et al., "Profiling Program and User Behaviors for Anomaly Instrusion Detection Based on Non-negative Matrix Factorization", Dec. 14-17, 2004, 43rd IEEE Conference on Decision and Control, pp. 99-104.*

(Continued)

*Primary Examiner* — Eleni Shiferaw
*Assistant Examiner* — Nelson Giddins
(74) *Attorney, Agent, or Firm* — Barry N. Young (57) ABSTRACT

Techniques to reduce false positives in detecting anomalous use of resources are disclosed. In various embodiments, resource access data indicating for each resource in a set of resources respective usage data for each of one or more users of the resource is received. Cluster analysis is performed to determine one or more clusters of users. For each cluster, a set of recommended resources to be associated with the cluster is determined. For each of at least a subset of users, a temporal behavior based model for each user that reflects one or more resources included in the set of recommended resources associated with a corresponding cluster of which the user is a member is generated.

23 Claims, 6 Drawing Sheets

(56) References Cited

U.S. PATENT DOCUMENTS

2015/0235152 A1* 8/2015 Eldardiry .......... G06Q 10/0635
                                                         705/7.28
2015/0242623 A1* 8/2015 Lindo ................. G06F 21/552
                                                         726/23

OTHER PUBLICATIONS

Wang, et al., "Profiling Program and User Behaviors for Anomaly Instrusion Detection Based on Non-negative Matrix Factorization", Dec. 14-17, 2004, 43rd IEEE Conference on Decision and Control, pp. 99-104.*

Akoglu, Leman, et al., "Anomaly Detection in Large Graphs", Nov. 2011, Carnegie Mellon University School of Computer Science, p. 1-16.*

Che, Z, et al., "Community-based anomaly detection in evolutionary networks", Mar. 2011, The Journal of Intelligent Information Systems: Integrating Artificial Intelligence and Database Technologies, p. 1-27.*

* cited by examiner

RECOMMENDATION SYSTEM BASED APPROACH IN REDUCING FALSE POSITIVES IN ANOMALY DETECTION

BACKGROUND OF THE INVENTION

Techniques have been disclosed to detect anomalous behavior, for example anomalous resource access behavior by users of a set of resources, in order to detect insider threats in an enterprise network. For example, a temporal behavior matrix per user may be analyzed, e.g., via a subspace learning method such as principal component analysis, to model normal historical behavior, and the model will be used to detect anomalous behavior that departs from the historical baseline captured by the model.

Behavior detected as being anomalous may require investigation or other responsive action. In some cases, a behavioral modeling approach to anomaly detection as described above may generate too many alerts to be investigated in a timely and effective manner, and/or potentially too many "false positives", i.e., identifying as anomalous behaviors that are not of concern, such as a user being observed to use for the first time a resource that is in a same group of resources as other resources the user has been observed to have accessed before.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to reduce the false positive in behavior modeling-based fraud and/or other anomaly detection approaches are disclosed. In various embodiments, clusters of users, resources, or other populations under consideration may be determined. Members of a cluster may be used to augment a temporal behavior-based model in a manner that reduces the likelihood that newly-observed interaction with a cluster member and/or a resource or other relevant asset associated with a member of a same cluster as a subject of analysis will be identified as anomalous.

Figure 1:
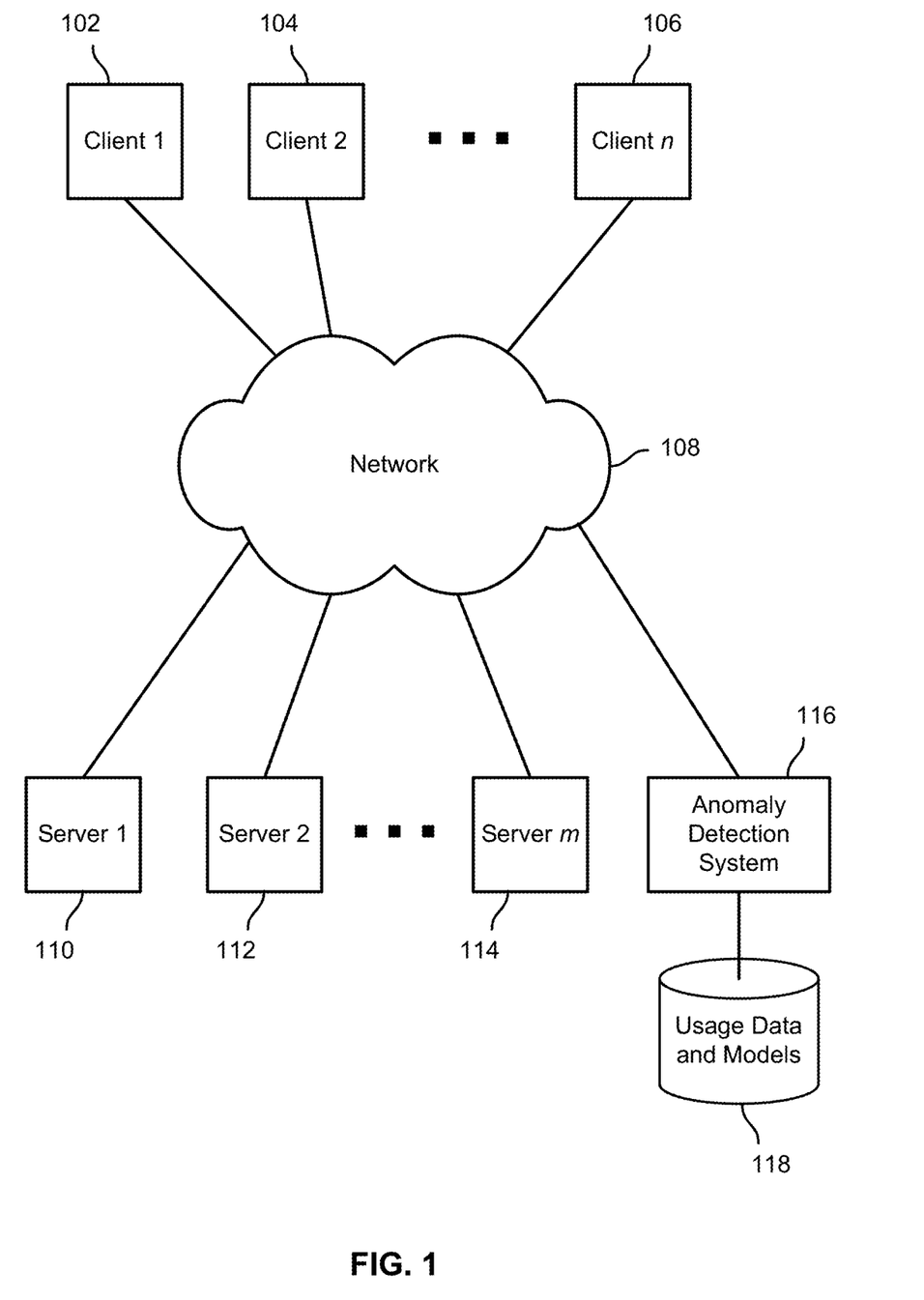
FIG. 1 is a block diagram illustrating an embodiment of a behavior-based anomaly detection system.

FIG. 1 is a block diagram illustrating an embodiment of a behavior-based anomaly detection system. In the example shown, a plurality of client systems, represented in FIG. 1 by client systems 102, 104, and 106, have access via a network 108 to a plurality of servers or other computing resources, represented in FIG. 1 by servers 110, 112, and 114. In some embodiments, servers such as servers 110, 112, and 114 may be enterprise servers made available to users of an enterprise network 108 to perform work-related functions, such as creating, storing, and accessing files or other stored objects; using server-based applications to perform enterprise-related tasks; etc.

Typically, users within an enterprise or other group of users will interact with only a subset of servers or other resources made available to enterprise (or other) users. For example, a given user's job function, department or other user group affiliation, and/or geographic and/or other network topographically relevant location may affect and/or determine a subset of resources with which that user interacts in the normal course of the user's work. Anomaly detection techniques may be used in various embodiments to detect anomalous interaction with resources by a user or group of users, such as suddenly accessing a resource the user has not been observed to have accessed in the past.

In the example shown in FIG. 1, an anomaly detection system 116 is provided. The anomaly detection system 116 receives and processes usage data stored in a usage data and model store (e.g., a database or other data store) 118 to generate and store in data store 118, for each user (and/or group of user) a model that defines and represents the user's "normal" interaction with the protect set of resources and which can be used to detect anomalous interactions with such resources.

In some embodiments, Microsoft® Active Directory and/or other login authentication information is received by anomaly detection system 116 and used to generate for each of a plurality of users a corresponding model of that user's access behavior with respect to a protected set of resources, such as the plurality of servers represented in FIG. 1 by servers 110, 112, and 114. In various embodiments, a temporal behavior matrix, e.g., reflecting a user's interaction with members of a protected set of servers or other resources during each of one or more periods, is created. At least a portion of the temporal behavior matrix may be used to generate a model of user behavior with respect to the resources, e.g., via a subspace learning method such as principal component analysis (PCA), k-nearest neighbor, and/or other analysis. The model may be used to detect anomalous user interaction with resources during a detection phase.

Refining temporal behavior based anomaly detection by determining and considering in anomaly detection analysis clusters of users and/or resources, e.g., at one or more levels of granularity, is disclosed. In various embodiments, clusters of users and/or resources may be determined, and behavior that might otherwise have been determined to be anomalous when considering (only) a user's own past behavior may be less likely to result in the behavior being determined by the system to be anomalous. For example, in various embodiments, a newly-observed interaction with a server that is in a same cluster of servers as one or more other servers with which the user has been observed to have interacted previously may be less likely to be identified as being anomalous. In some embodiments, a newly-observed interaction with a server that has been observed to have been interacted with previously by another user with which the interacting user is associated may be less likely to be identified as being anomalous. In some embodiments, a model of a user's (or other entity's) behavior as observed in a training period may be augmented to reflect resources determined to be "recommended" for that user, e.g., based on association of those resources with other users with which the user is associated and/or with other resources the user has been observed to access, as described more fully below.

While in the example shown in FIG. 1 the users/consumers of resources are represented by client systems 102, 104, and 106, in various embodiments anomaly detection may be performed with respect to resources users/consumers other than client computer systems. Likewise, while in the example shown in FIG. 1 the resources with respect to which anomaly detection is performed are computing resources, such as servers 110, 112, and 114, in various embodiments anomaly detection may be performed with respect to resources other than servers.

Figure 2:
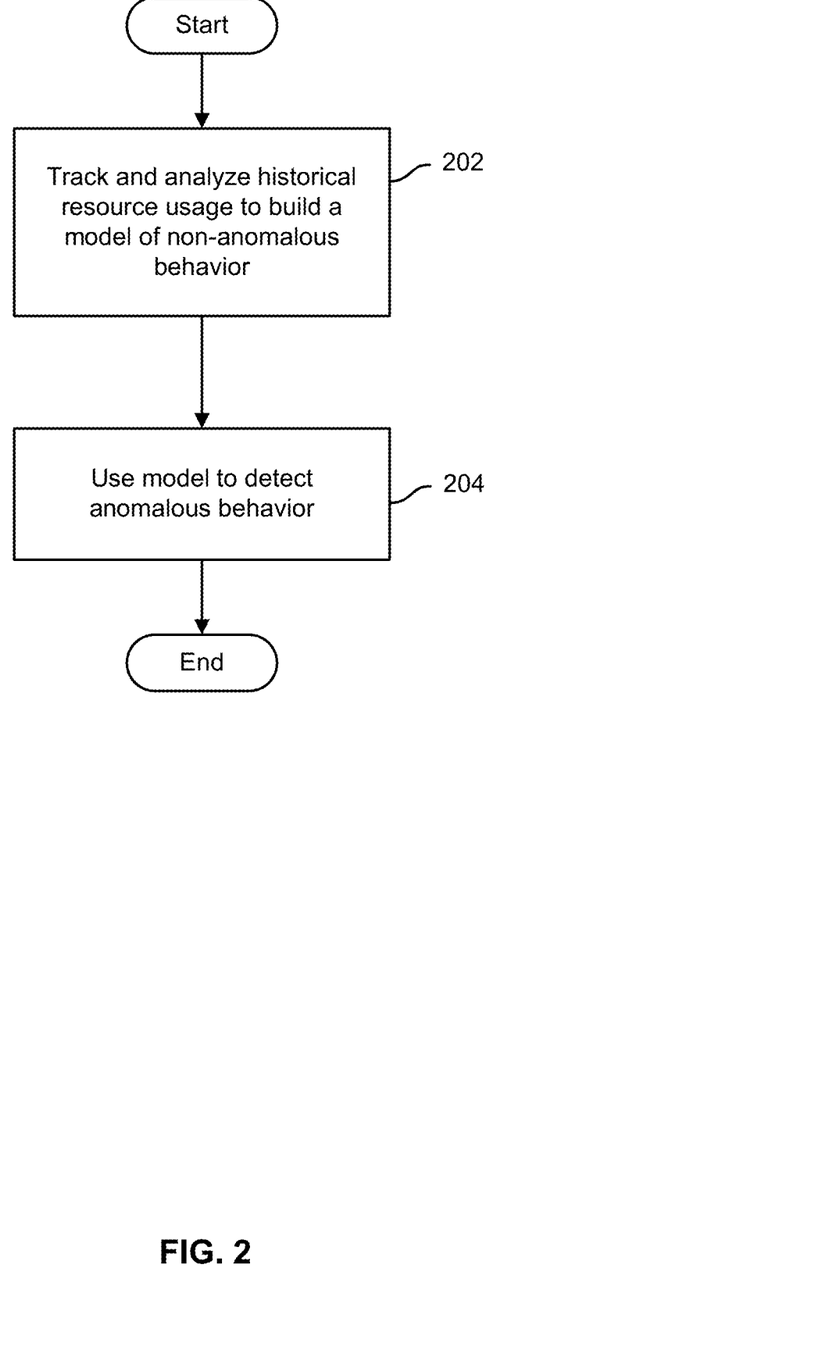
FIG. 2 is a flow chart illustrating an embodiment of a process to detect anomalous behavior.

FIG. 2 is a flow chart illustrating an embodiment of a process to detect anomalous behavior. In some embodiments, the process of FIG. 2 is implemented by an anomaly detection system, such as anomaly detection system 116 of FIG. 1. In the example shown, historical resource usage data (e.g., resource usage data observed during a "training" period) is tracked and analyzed to build a model of non-anomalous behavior (202). For example, Active Directory service data or login authentication information may be used to determine which users accessed which server (or other) resources during a training period. The model is used to detect anomalous behavior (204). For example, the model may be used to determine that a user has deviated from the user's previously-observed access pattern, for example by accessing a resource the user has not been observed to have accessed previously; by accessing a resources more (or less) frequently and/or on different times, days of the week, etc., than observed previously; etc. In various embodiments, a model created for a user may be augmented, as described more fully below, to reflect resources that while not actually observed to have been accessed by the user have been determined to be "recommended" for the user, for example based on the access patterns of users with whom the subject user is associated and/or access by the subject user to resources with which the recommended resources are associated. In some embodiments, a recommendation system and/or process may be used to determine the recommended resources to be reflected in a user's model. In some embodiments, recommended resources are reflected in a user's model in a manner that is the same as or similar to the manner in which resources previously observed to have been interacted with by the user are reflected, e.g., as described more fully below.

Figure 3:
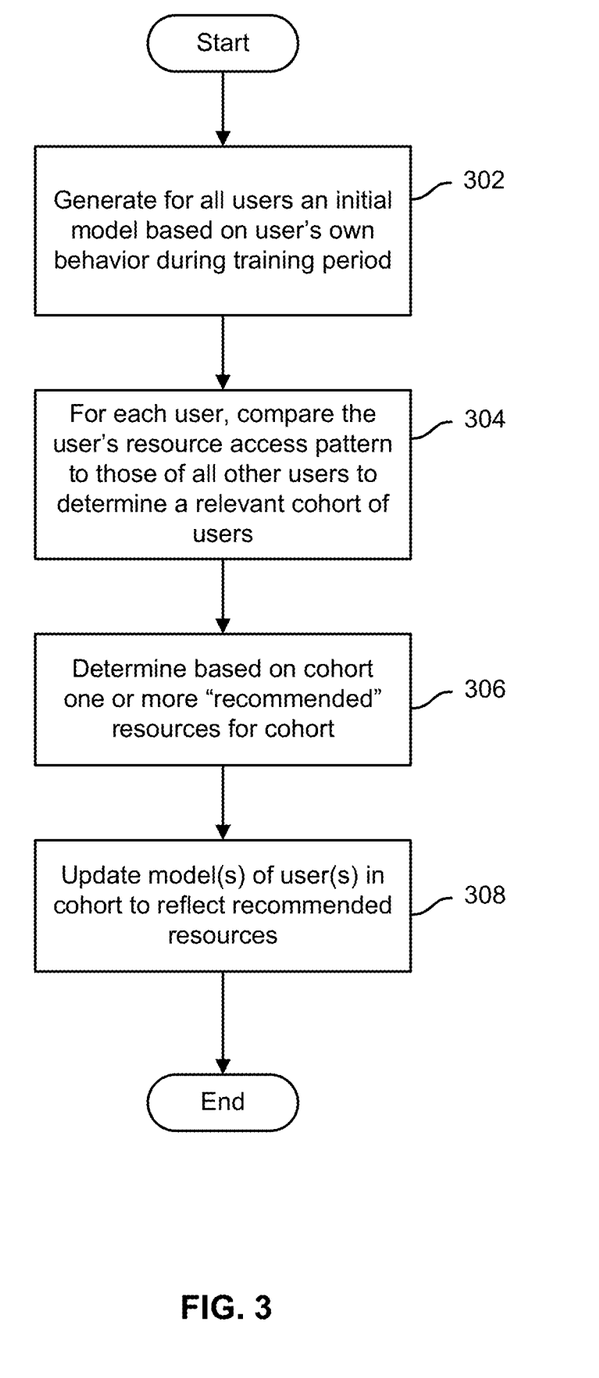
FIG. 3 is a flow chart illustrating an embodiment of a process to detect anomalous behavior.

FIG. 3 is a flow chart illustrating an embodiment of a process to detect anomalous behavior. In the example shown, for each user in a set of users, an initial model based on that user's own behavior during a training period is generated (302). The data access patterns from all users are compared to each user to determine the user's relevant cohort of users (304). In some embodiments, the cohort may be determined at least in part programmatically, e.g., via cluster analysis. In some embodiments, the cohort may be determined at least in part based on external (i.e., not observed resource usage) data, such as by determining which users have the same role, are associated with the same department or other group, are associated with a same geographic area, etc. For each cohort of user, one or more "recommended" resources to be associated with the cohort are determined (306). For example, once a cohort (or other grouping) of users have been determined, resources that are "popular" with users in the cohort may be included in the "recommended" resources for the cohort. In some embodiments, resources that have been accessed (e.g., during a "training" or other observation period) by at least a prescribed number or proportion (e.g., percentage) of users in the cohort are included in the "recommended" resources for the cohort. In some embodiments, resources used by 30% or more of the cohort are included in the "recommended" set. In some embodiments, resources used by at least a majority of the cohort are included in the "recommended" set. The recommended resources are used to update the respective models of members of the cohort to reflect the recommended resources (308). In some embodiments, a column or other data structure portion is added to include the recommended resources in a temporal behavior matrix of a user, and the modified temporal behavior matrix is used to generate a model that reflects the recommended resources.

Figure 4:
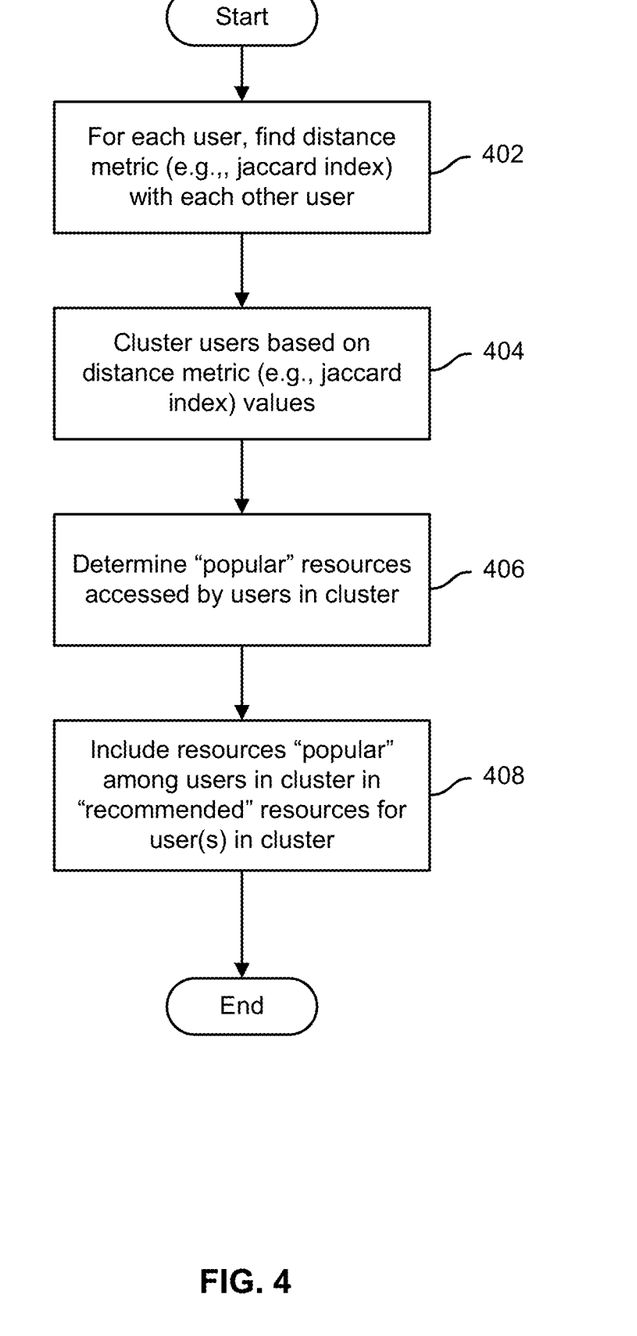
FIG. 4 is a flow chart illustrating an embodiment of a process to refine a behavior-based model to reflect "recommended" resources.

FIG. 4 is a flow chart illustrating an embodiment of a process to refine a behavior-based model to reflect "recommended" resources. In the example shown, for each user in a set of users, a distance metric of that user with respect to each other user in the set is determined (402). In some embodiments, a jaccard index is used as the distance metric. Users are clustered based on the respective distance metric (e.g., jaccard index) values (404). For each cluster, resources that are "popular" among users in the cluster (e.g., accessed by 30% or more; accessed by a majority; etc.) are determined (406), and the popular resources are included in a set of "recommended" resources for the cluster (408).

Figure 5:
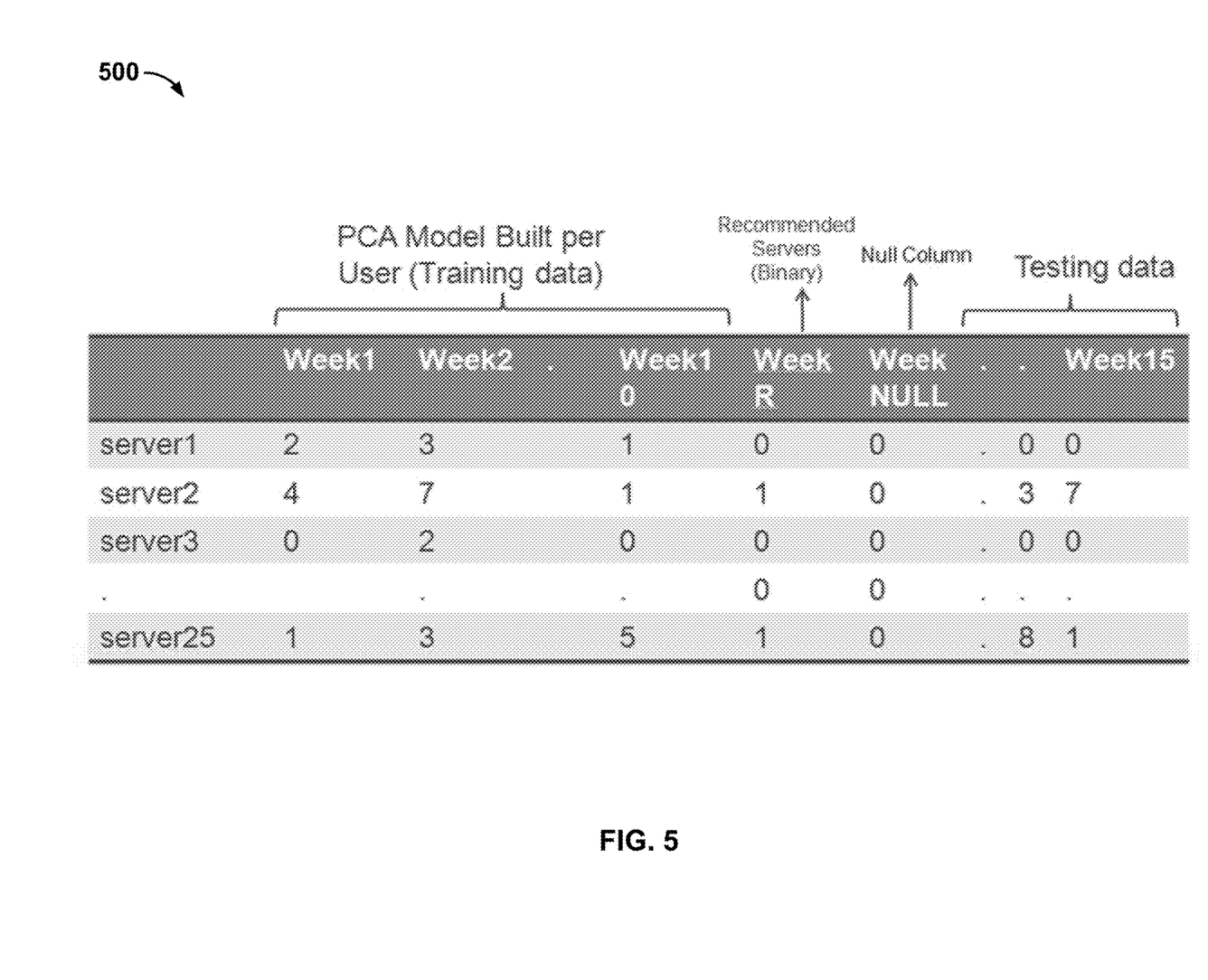
FIG. 5 is a block diagram illustrating an example of behavioral analysis performed by a behavior-based anomaly detection system in some embodiments.

FIG. 5 is a block diagram illustrating an example of behavioral analysis performed by a behavior-based anomaly detection system in some embodiments. In the example shown, a temporal behavior matrix 500 includes a PCA model built based on user resource access data for a training period (e.g., columns labeled "Week 1" through "Week 10"). In addition, a column labeled "Week R" has been added to include a set of "recommended" resources, in this case servers. In the example shown, for each server (1 through 25), a binary value is included in the "Week R" column, e.g., a "0" if the server is not in the recommended set and a "1" if the server is in the recommended set. Further, in this example a "Week NULL" has been added, with "0" values for all servers, for example to train the model to expect that there may be a normal, non-anomalous week in which the user does not access any servers, to anticipate the fact that a user may from time to time be on vacation for an entire week (or more). In various embodiments, including the "recommended" column and in this example the "null" column would result in a refined or modified model that would reduce the likelihood of an anomaly being determined to have been detected based on user interaction with servers in the recommended set and/or a week in which the user does not access any server. Finally, in this example, in the columns labeled "Testing data", resource access data for a testing period subsequent to "Week 10" (e.g., Weeks 11 through 15) are shown.

Figure 6:
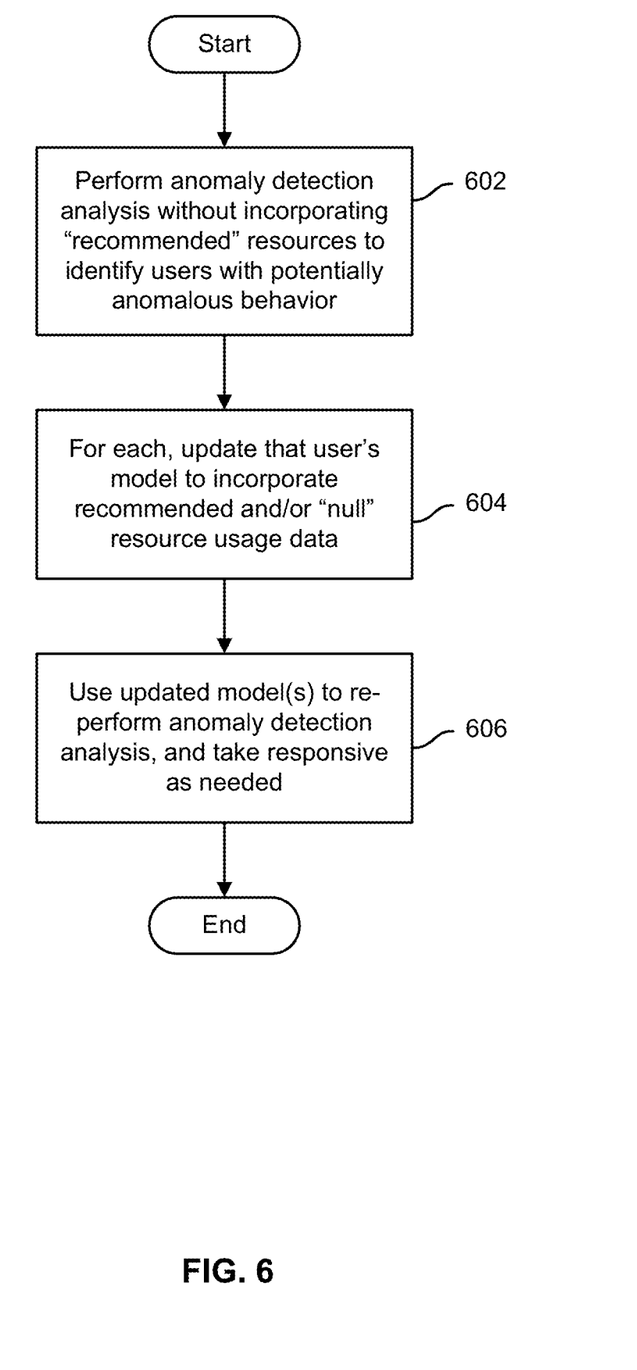
FIG. 6 is a flow chart illustrating an embodiment of a process to detect anomalous behavior.

FIG. 6 is a flow chart illustrating an embodiment of a process to detect anomalous behavior. In the example shown, in a first phase, anomaly detection analysis is performed without incorporating "recommended" resources into users' respective models (602). For each user identified in the first phase (602) as having potentially anomalous behavior, a further, second phase of analysis is performed by updating that user's model to incorporate data reflecting resources that are "recommended" for that user, e.g., as disclosed herein, and/or a "null" column or other null set of data (604), and the updated model is used to detect anomalies and take responsive action as needed (606). In some embodiments, perform a two stage analysis as shown in FIG. 6 enables relatively lower cost processing to be used (602) to identify a subset of users with respect to which the further processing required to determine a set of recommended resources for a user and incorporate the recommended resources in the user's model will be performed (604, 606), enabling false positives to be reduced without having to determine recommended resources and updated models even for users whose behavior during the test period is determined to be not anomalous using a model that does not reflect any recommended resources.

Using techniques disclosed herein, false positive results in temporal behavior based anomaly detection may be reduced, enabling investigative resources to be focused on anomalies that are more likely to be associated with fraud and/or to otherwise require responsive action.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of detecting anomalous use of resources, comprising:
receiving resource access data indicating for each resource in a set of resources respective usage data for each of one or more users of the resource;
using a processor to perform cluster analysis to determine one or more clusters of users, said clusters being determined based upon a characteristic of users that does not relate to resource usage by said users;
for each cluster, determining a set of recommended resources to be associated with the cluster, said recommended resources being determined based upon accesses by users that are members of the cluster; and
for each user of at least a subset of users, generating for the user a temporal behavior based model that reflects one or more resources included in the set of recommended resources associated with a corresponding cluster of which the user is a member, wherein the generating for the user the temporal behavior based model includes augmenting the temporal behavior based model to include a no access scenario in which no resource is accessed by the user over a threshold period of time such that detection of the no access scenario does not trigger an anomaly in relation to usage data for the user.

2. The method of claim 1, wherein the resource access data comprises directory service or other server access data.

3. The method of claim 1, wherein using the processor to perform cluster analysis includes using the processor to compute for each user, based on the resource usage data, a distance metric with respect to each other user.

4. The method of claim 3, wherein the distance metric is a jaccard index.

5. The method of claim 1, wherein determining a set of recommended resources to be associated with a cluster includes determining that a recommended resource has been accessed by at least a prescribe number or proportion of users in the cluster, and including the recommended resource in the set of recommended resources to be associated with the cluster based at least in part the determination that the recommended resources has been accessed by at least a prescribe number or proportion of users in the cluster.

6. The method of claim 1, wherein the characteristic of users for determining a cluster comprises a user's role or geographic area.

7. The method of claim 1, wherein generating for a user a temporal behavior based model that reflects one or more resources included in the set of recommended resources associated with a corresponding cluster of which the user is a member comprises adding to a temporal behavior matrix associated with the user a column or other data structure element that includes data values associated with accessing said one or more resources included in the set of recommended resources.

8. The method of claim 7, wherein the data value comprises a binary value.

9. The method of claim 7, wherein the temporal behavior matrix associated with the user includes a column or other data structure element that includes null data values for all resources included in the set of resources.

10. The method of claim 1, further comprising determining the subset of users for which a temporal behavior based model that reflects one or more resources included in the set of recommended resources associated with a corresponding cluster of which the user is a member is generated.

11. The method of claim 10, wherein determining the subset of users comprises performing a first stage of anomaly detection for each of the one or more users, using for each user in the first stage a corresponding temporal behavior based model that does not reflect said one or more resources included in the set of recommended resources associated with a corresponding cluster of which the user is a member, and including a user in the subset of users based at least in part on a determination in the first stage that an anomaly has been detected.

12. The method of claim 1, wherein the no access scenario in which no resource is accessed by the user over a threshold period of time such that detection of the scenario does not trigger an anomaly in relation to usage data for the user is configured such that even if a lack of access of a resource by the user over the threshold period of time is anomalous in relation to behavior of one or more users, the lack of access of a resource is deemed to not be anomalous in the event that the lack of access persists for at least the threshold period of time.

13. A system to detect anomalous use of resources, comprising:
   a memory; and
   a processor coupled to the memory and configured by executable instructions in said memory that control the processor to:
   perform cluster analysis to determine one or more clusters of users based upon a characteristic of users that does not relate to resource usage by said users;
   for each cluster, determine a set of recommended resources to be associated with the cluster, said recommended resources being determined based upon accesses by users that are members of the cluster; and
   for each user of at least a subset of users, generate for the user and store in the memory a temporal behavior based model that reflects one or more resources included in the set of recommended resources associated with a corresponding cluster of which the user is a member, wherein the generating for the user the temporal behavior based model includes augmenting the temporal behavior based model to include a no access scenario in which no resource is accessed by the user over a threshold period of time such that detection of the no access scenario does not trigger an anomaly in relation to usage data for the user.

14. The system of claim 13, wherein the resource access data comprises directory service or other server access data.

15. The system of claim 13, wherein the processor is configured to perform the cluster analysis at least in part by computing for each user, based on the resource usage data, a distance metric with respect to each other user in the one or more users.

16. The system of claim 15, wherein the distance metric is a jaccard index.

17. The system of claim 13, wherein the processor is configured to determine a set of recommended resources to be associated with a cluster at least in part by determining that a recommended resource has been accessed by at least a prescribe number or proportion of users in the cluster.

18. The system of claim 13, wherein the characteristic of users for determining a cluster comprises a user's role or geographic area.

19. The system of claim 13, wherein generating for a user a temporal behavior based model that reflects one or more resources included in the set of recommended resources associated with a corresponding cluster of which the user is a member comprises adding to a temporal behavior matrix associated with the user a column or other data structure element that includes data values associated with accessing said one or more resources included in the set of recommended resources.

20. The system of claim 19, wherein the data value comprises a binary value.

21. The system of claim 13, wherein the processor is further configured to determine the subset of users for which a temporal behavior based model that reflects one or more resources included in the set of recommended resources associated with a corresponding cluster of which the user is a member is generated.

22. The system of claim 21, wherein the processor is configured to determine the subset of users at least in part by performing a first stage of anomaly detection for each of the one or more users, using for each user in the first stage a corresponding temporal behavior based model that does not reflect said one or more resources included in the set of recommended resources associated with a corresponding cluster of which the user is a member, and including a user in the subset of users based at least in part on a determination in the first stage that an anomaly has been detected.

23. A computer program product to detect anomalous use of resources, the computer program product being embodied in a non-transitory computer readable storage medium and comprising computer instructions for:
   receiving resource access data indicating for each resource in a set of resources respective usage data for each of one or more users of the resource;
   using a processor to perform cluster analysis to determine one or more clusters of users, said clusters being determined based upon a characteristic of users that does not relate to resource usage by said users;
   for each cluster, determining a set of recommended resources to be associated with the cluster, said recommended resources being determined based upon accesses by users that are members of the cluster; and
   for each user of at least a subset of users, generating for the user a temporal behavior based model that reflects one or more resources included in the set of recommended resources associated with a corresponding cluster of which the user is a member, wherein the generating for the user the temporal behavior based model includes augmenting the temporal behavior based model to include a no access scenario in which no resource is accessed by the user over a threshold period of time such that detection of the no access scenario does not trigger an anomaly in relation to usage data for the user.

* * * * *